United States Patent
Lai et al.

(10) Patent No.: US 8,258,796 B2
(45) Date of Patent: Sep. 4, 2012

(54) SYSTEM FOR TESTING ELECTRONIC DEVICES

(75) Inventors: Chun-Chin Lai, Tu-Cheng (TW); Jiann-Chyi Rau, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 324 days.

(21) Appl. No.: 12/764,974

(22) Filed: Apr. 22, 2010

(65) Prior Publication Data

US 2011/0101993 A1     May 5, 2011

(30) Foreign Application Priority Data

Oct. 30, 2009 (CN) .......................... 2009 1 0309107

(51) Int. Cl.
*H01H 31/02* (2006.01)

(52) U.S. Cl. ........ 324/556; 324/538; 324/555; 324/426; 324/428; 324/444; 340/2.1; 340/2.5; 340/7.32; 340/513; 340/514; 439/188; 338/22 R

(58) Field of Classification Search .................. 324/556, 324/538, 555, 426, 428, 444; 340/2.1, 2.5, 340/7.32, 531, 514; 439/188; 338/22 R
See application file for complete search history.

(56) References Cited

U.S. PATENT DOCUMENTS

| | | | | |
|---|---|---|---|---|
| 2,999,980 A * | 9/1961 | Barnes | .......................... | 324/429 |
| 3,991,362 A * | 11/1976 | Blair et al. | .................... | 324/538 |
| 4,215,306 A * | 7/1980 | Mace | .............................. | 320/105 |
| 4,578,628 A * | 3/1986 | Siwiak | ............................ | 320/127 |
| 5,092,785 A * | 3/1992 | Chen | ............................... | 439/188 |
| 5,128,962 A * | 7/1992 | Kerslake et al. | ............... | 375/220 |
| 5,272,475 A * | 12/1993 | Eaton et al. | .................... | 340/7.32 |
| 5,387,899 A * | 2/1995 | DiLauro et al. | ............... | 340/514 |
| 5,638,043 A * | 6/1997 | Sakai et al. | .................. | 340/384.6 |
| 5,781,016 A * | 7/1998 | Maeda | ............................ | 324/538 |
| 5,945,829 A * | 8/1999 | Bertness | ........................ | 324/430 |
| 6,056,590 A * | 5/2000 | Takahashi et al. | ............. | 439/489 |
| 6,157,316 A * | 12/2000 | Okayama et al. | ............. | 340/7.32 |
| 6,593,758 B2 * | 7/2003 | Mulera et al. | .................. | 324/713 |
| 6,605,948 B2 * | 8/2003 | Russell | .......................... | 324/538 |
| 6,632,099 B2 * | 10/2003 | Rygwelski et al. | ............ | 439/188 |
| 6,667,624 B1 * | 12/2003 | Raichle et al. | ................. | 324/522 |
| 6,869,299 B2 * | 3/2005 | Tanaka et al. | .................. | 439/188 |
| 7,038,463 B2 * | 5/2006 | Cooper et al. | ................. | 324/538 |
| 7,295,129 B2 * | 11/2007 | Eisenson | ..................... | 340/636.1 |
| 7,385,373 B2 * | 6/2008 | Doruk et al. | ................... | 320/107 |
| 7,412,344 B2 * | 8/2008 | Chang et al. | .................. | 702/121 |
| 7,595,642 B2 * | 9/2009 | Doyle | ............................ | 324/426 |
| 7,652,566 B2 * | 1/2010 | Lee et al. | ....................... | 340/515 |
| 7,761,198 B2 * | 7/2010 | Bhardwaj | ......................... | 701/19 |
| 8,013,618 B2 * | 9/2011 | Ishikawa et al. | ............... | 324/555 |
| 2005/0151657 A1* | 7/2005 | Lockhart et al. | ........... | 340/636.1 |
| 2006/0145710 A1* | 7/2006 | Puleston et al. | .............. | 324/750 |
| 2007/0115111 A1* | 5/2007 | Girouard | ...................... | 340/507 |
| 2011/0089893 A1* | 4/2011 | Hussain et al. | ............... | 320/107 |

* cited by examiner

*Primary Examiner* — Patrick Assouad
*Assistant Examiner* — Lamarr Brown
(74) *Attorney, Agent, or Firm* — Altis Law Group, Inc.

(57) ABSTRACT

A system for testing an electronic device comprises a first output, a second output, and a third output connected to a positive input, an identification input, and a negative input of the electronic device, respectively. The system further comprises a switch comprising at least two dynamic contacts, each of which is connected to a resistor for the use of identification.

5 Claims, 5 Drawing Sheets

SYSTEM FOR TESTING ELECTRONIC DEVICES

CROSS-REFERENCE TO RELATED APPLICATION

The present application Ser. No. 12/764,974 claims the benefit of under 35 U.S.C. 119 from Chinese Patent Application CN200910309107.3, filed on Oct. 30, 2009.

BACKGROUND

1. Technical Field

The present disclosure relates to device testing, and specifically to a system for testing electronic devices.

2. Description of Related Art

Most commonly used rechargeable batteries can exhibit shortcomings when used in testing. Such batteries lose total available power with time, which can allow misjudgment of testing results when the power level drops below a certain threshold. Furthermore, such batteries are inefficient, since a great deal of power is lost during recharging. Moreover, recharging is time consuming and expired batteries present environmental hazards and require specialized disposal. Thus, what is called for is a testing system to address the limitations described.

DETAILED DESCRIPTION

Figure 1:
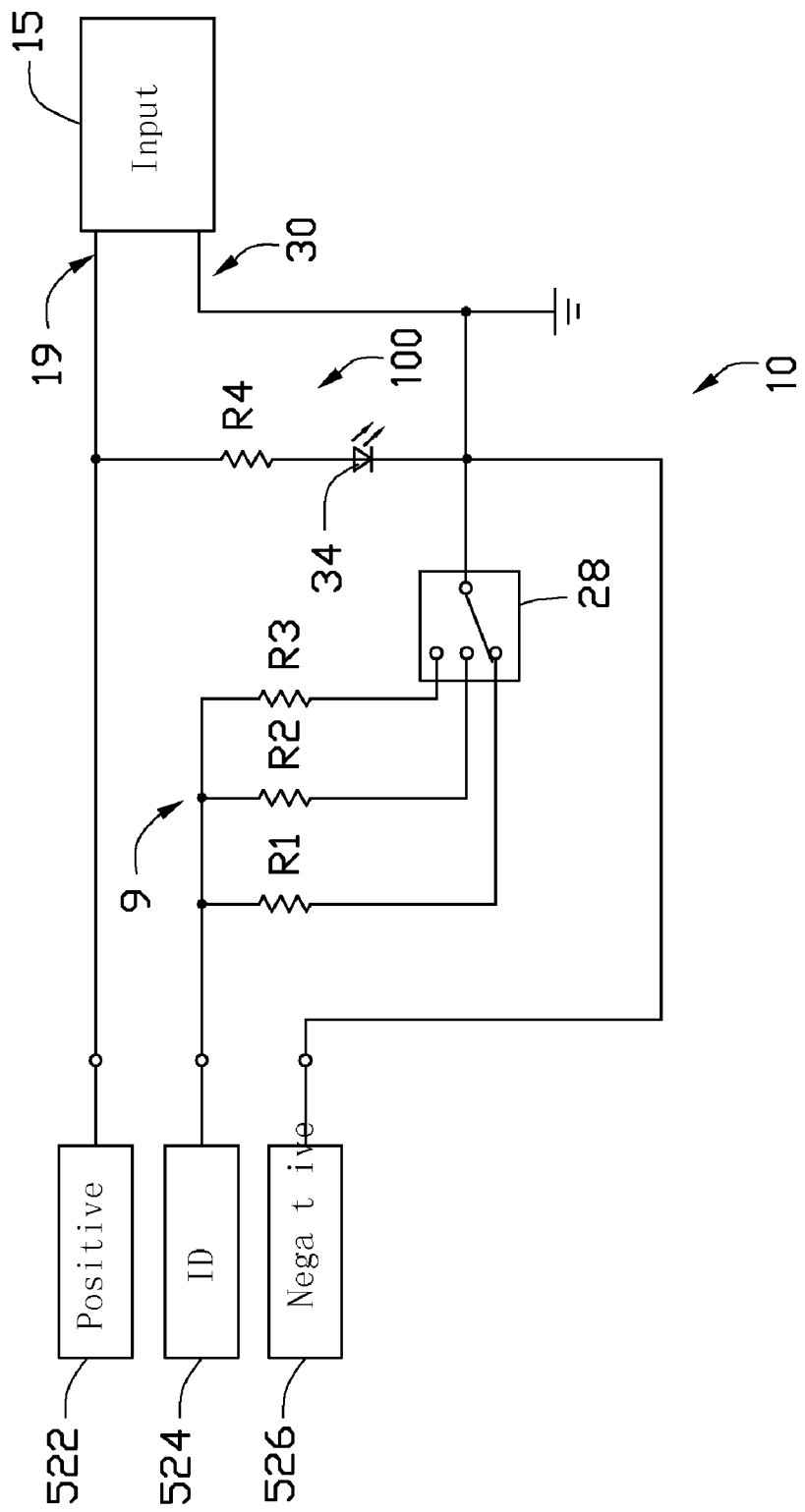
FIG. 1 is a view of one embodiment of a switch circuit of a system for testing an electronic device.

FIG. 1 is a view of one embodiment of a switch circuit 10 of a system 3 (shown in FIG. 2) for testing an electronic device. The switch circuit 10 an input interface 15, an output interface 52 (shown in FIG. 2), a light emitting diode (LED) 34, a switch 28, and a plurality of resistors R1, R2 and R3. A protective circuit 100 includes the LED 34 and a resistor R4 connected in series to prevent current spikes. The switch 28 connects the resistor R2 and R3 in parallel to serve as an identification switch circuit 9 for testing the electronic device. The power output interface 52 includes a positive terminal 522, an identification (ID) terminal 524, and a negative terminal 526. The input interface 15 has a first terminal 19 and a second terminal 30. One end of resistor R4 of the protective circuit 100 connects to the positive terminal 522 and another end of the resistor R4 connects to the first terminal 19. The LED 34 end of the protective circuit 100 connects to the negative terminal 526, to the second terminal 30, to a switch end of the switch circuit and to ground. The resistor R2 and R3 connect to the ID terminal 524. In other embodiments, resistor R1 can be added to the switch circuit to provide an extra common configuration.

Figure 2:
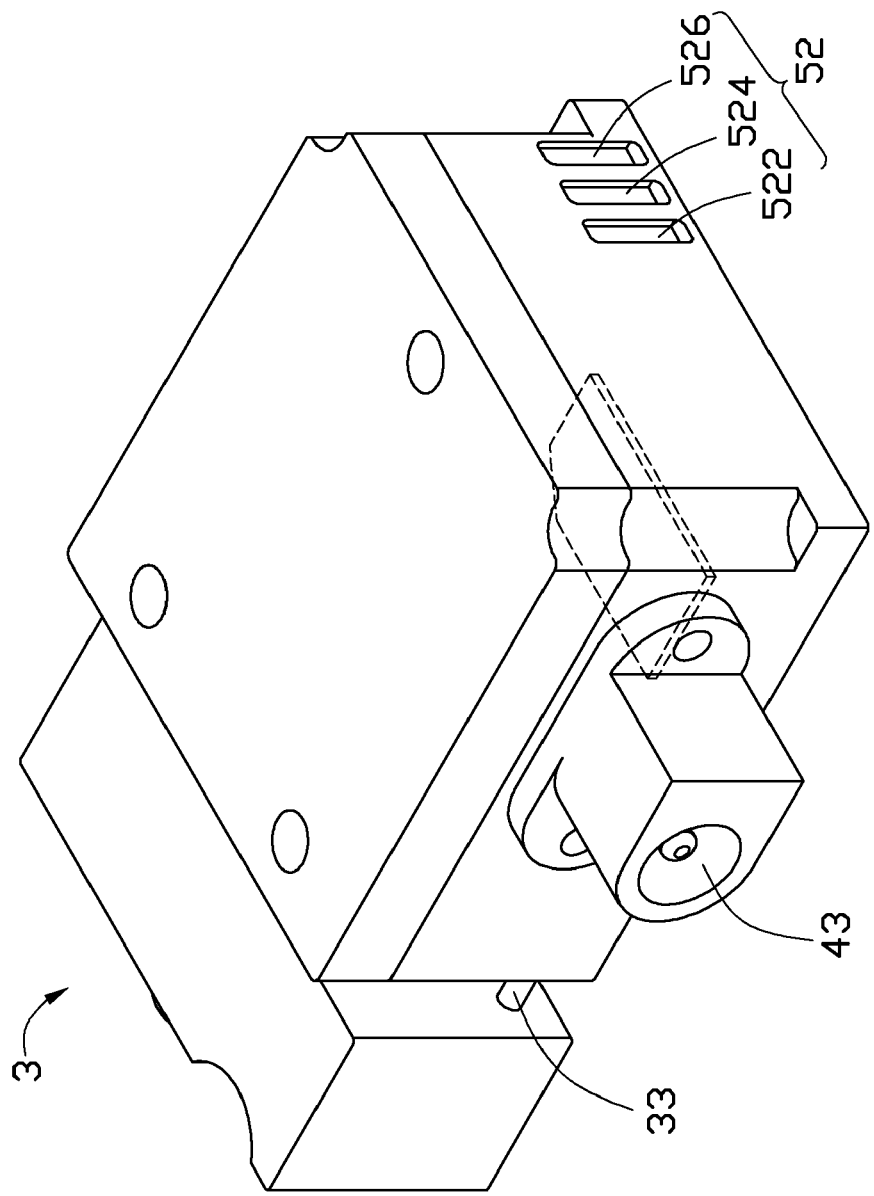
FIG. 2 is an isometric view of one embodiment of the system of FIG. 1.

FIG. 2 is an isometric view of one embodiment of the system 3 of FIG. 1. The system 3 includes the switch circuit 10, a direct current (DC) power input 43, a plurality of sliding rails 33, and a plurality of power output contacts 52. The DC power input 43 bridges the input interface 15 and an external DC power to provide a constant and stable voltage for the system. The sliding rails 33 allow adjustment of the length of the system to accommodate different configurations of test subjects. The power output 52 serves as an output interface between the system and the test subjects.

Figure 3:
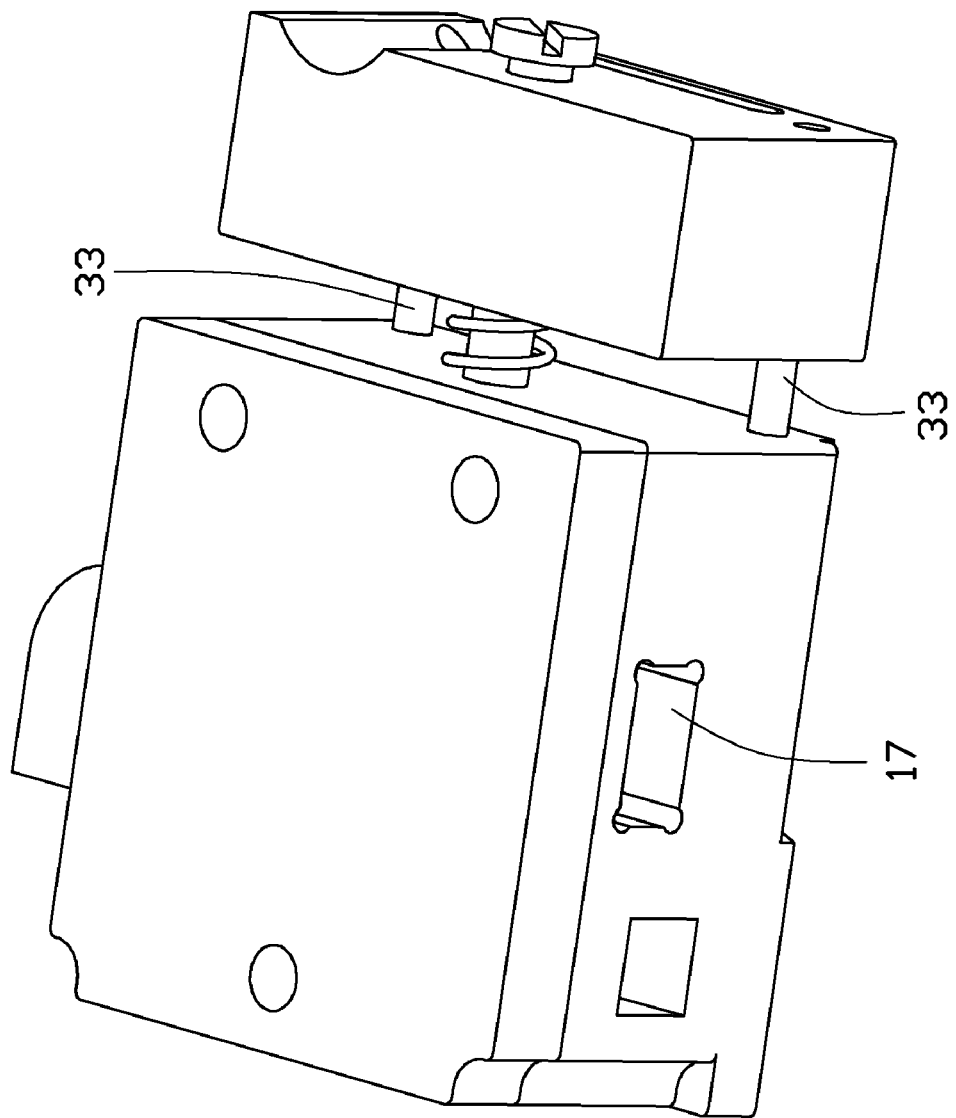
FIG. 3 is similar to FIG. 2, but viewed from another angle.

Also referring to FIG. 3 the system includes an ID switch 17 used to switch between configurations without resetting the system 3. In this embodiment, three configurations are available, including, without being limited to, a testing mode for a plurality of program tests, a first working mode and a second working mode for a plurality of manual tests. It should be understood that most test functions are programmed into a series of computerized procedures while the other test functions require manual testing. The testing mode is specifically used to cope with computerized testing. The first and the second working mode provide two of the most commonly used voltages for manual testing.

Figure 4:
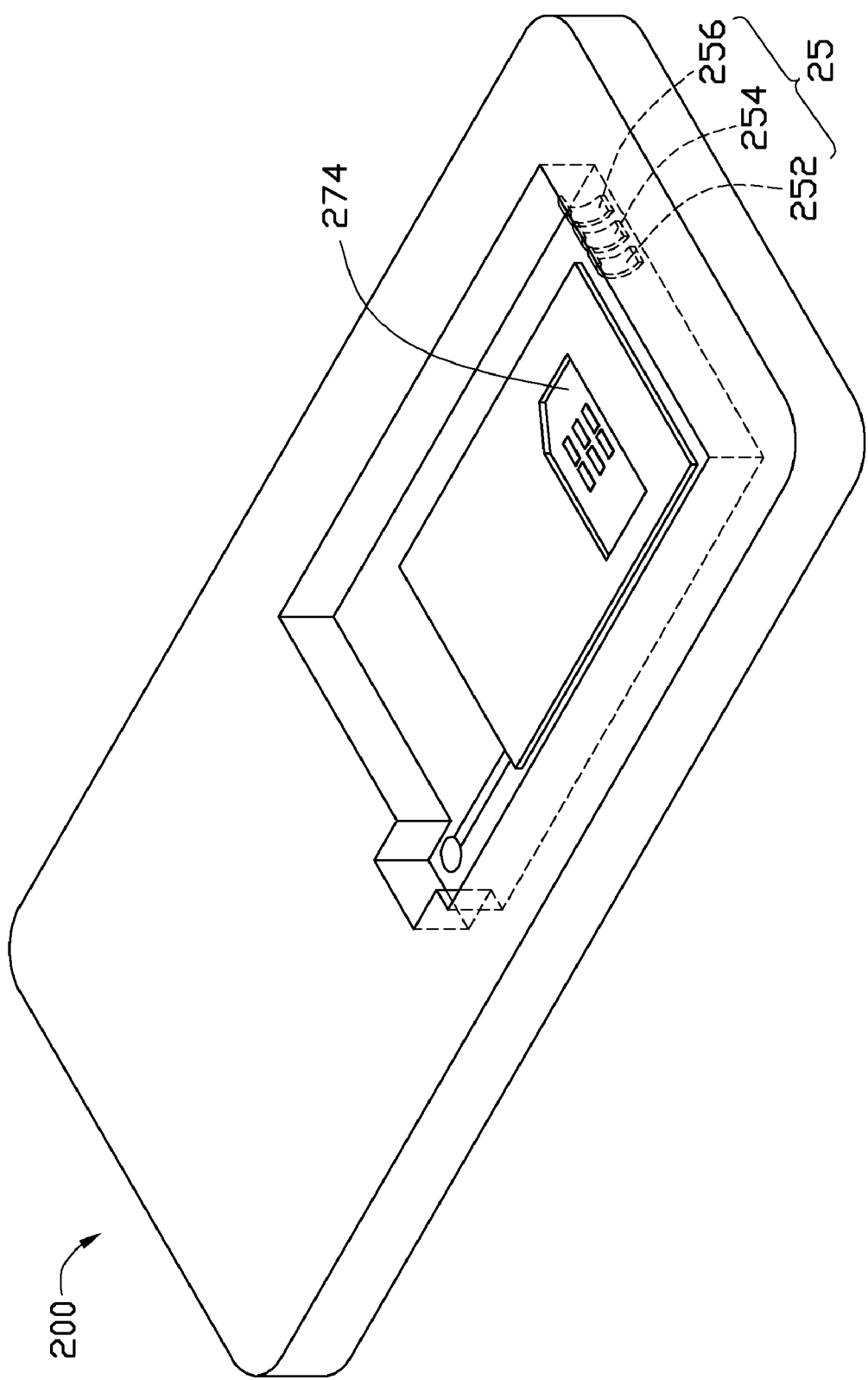
FIG. 4 is an isometric view of a test subject to be tested using the system of FIG. 2.
Figure 5:
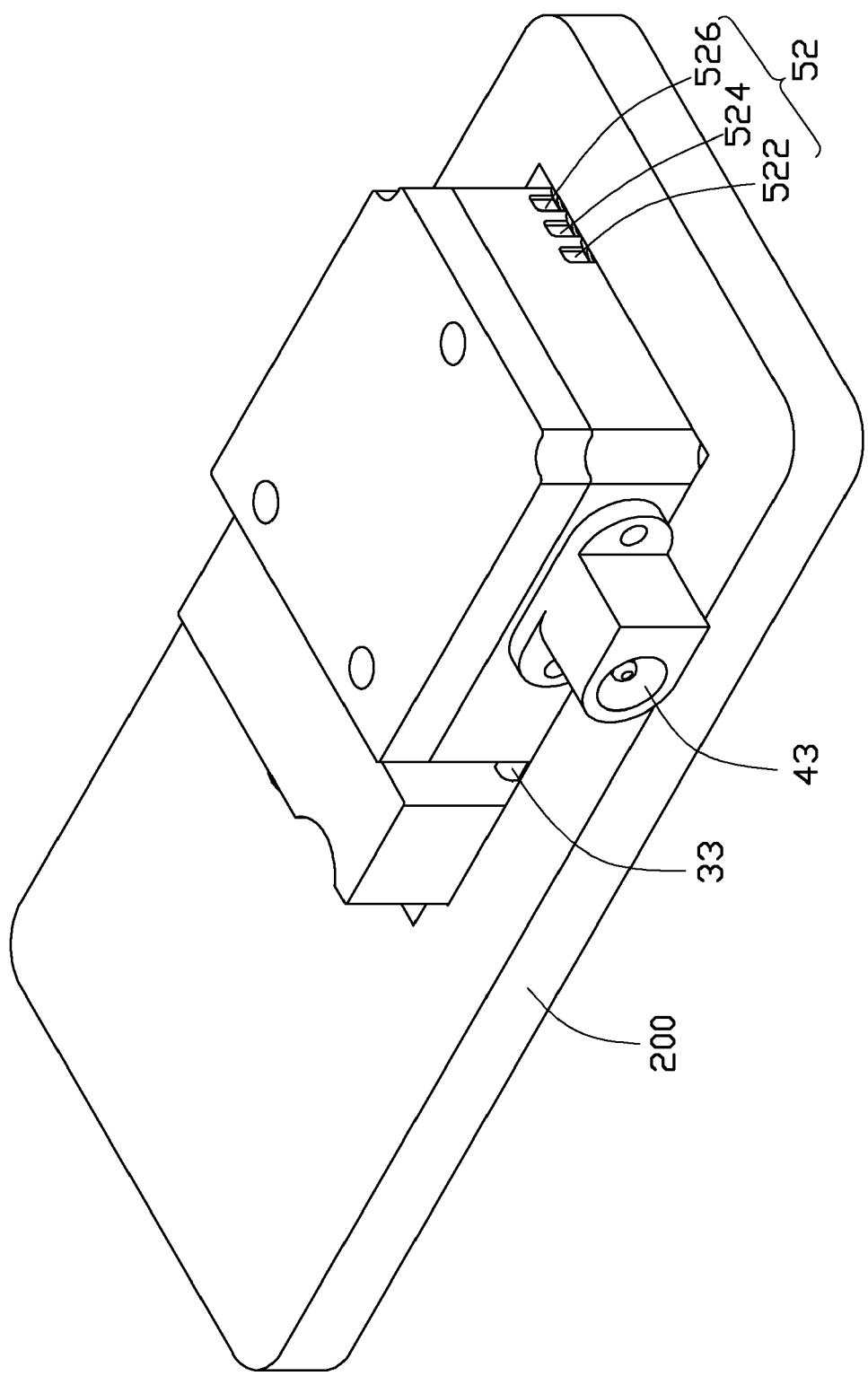
FIG. 5 is an isometric view of the testing system of FIG. 2 with the test subject of FIG. 4 deployed for testing.

FIG. 4 and FIG. 5 are isometric views of a test subject 200 and its deployment with the system as disclosed. The test subject 200 includes a user identification module (UIM) container 274 and a plurality of input contacts 25. The UIM container 274 fixes an UIM onto the object 200. The input contacts 25 transmit power to the object 200 by electronically connecting to a plurality of output contacts 52.

The present disclosure reduces manufacturing cost by deploying one adjustable model for most commonly used test subjects. More importantly, the disclosure provides an environmental friendly alternative for rechargeable batteries and shortens the testing cycle along the way. The disclosure manages to boost productivity, utilize power efficiency, and economize waste disposal all at the same time.

What is claimed is:

1. A system for testing an electronic device, the system comprising:
   a first output, a second output, and a third output connected to a positive input, an identification input, and a negative input of the electronic device, respectively;
   a first input and a second input connected to the first output and the third output, respectively;
   a switch comprising at least two dynamic contacts and a static contact; and
   at least two resistors, each of the at least two resistors having a first end connected to a first dynamic contact and a second dynamic contact of the switch, and a second end connected to the second output.

2. The system as claimed in claim 1, wherein the system further comprises an input interface connected to an external direct current power source.

3. The system as claimed in claim 1, further comprising:
   a light emitting diode, a cathode of which is connected to the second input; and
   a protective resistor connected between the first input and an anode of the light emitted diode.

4. The system as claimed in claim 1, wherein the second input of switch circuit is grounded.

5. The system as claimed in claim 1, further comprising an adjustable member to alter length of the system to correspond to length of the electronic device.

* * * * *